(12) United States Patent
Ridler

(10) Patent No.: US 6,327,971 B1
(45) Date of Patent: *Dec. 11, 2001

(54) FRUIT AND VEGETABLE PEELER

(76) Inventor: Donald G. Ridler, 149 Waterbury Ct., Westland, MI (US) 48185

( * ) Notice: Subject to any disclaimer, the term of this patent is extended or adjusted under 35 U.S.C. 154(b) by 0 days.

This patent is subject to a terminal disclaimer.

(21) Appl. No.: 09/546,474

(22) Filed: Apr. 10, 2000

Related U.S. Application Data

(62) Division of application No. 09/028,103, filed on Feb. 23, 1998, now Pat. No. 6,082,253.

(51) Int. Cl.[7] .............................. A23N 7/00; A23N 7/02; A23N 7/10; A47J 17/16
(52) U.S. Cl. ............................. 99/594; 99/595; 99/598; 99/599; 30/291; 30/290
(58) Field of Search ............................. 99/594, 595, 598, 99/599; 30/290, 291

(56) References Cited

U.S. PATENT DOCUMENTS

| | | |
|---|---|---|
| 404,452 * | 6/1889 | Webster . |
| 633,932 | 9/1899 | Williamson . |
| 2,069,654 | 2/1937 | Jeppsson et al. . |
| 2,182,688 | 12/1939 | Buchhagen . |
| 3,961,418 | 6/1976 | Neveu . |
| 5,279,035 * | 1/1994 | Cohen et al. . |
| 5,495,794 | 3/1996 | Ulysse . |
| 5,533,263 * | 7/1996 | Gilder . |
| 5,865,110 | 2/1999 | Yonezawa . |

* cited by examiner

Primary Examiner—Anthony J. Weier

(57) ABSTRACT

A fruit and vegetable peeler having a blade mounted on a handle and a handle for supporting and traversing the blade along an outer surface of a fruit or a vegetable. The handle has a steady rest for maintaining the position of the blade relative to the fruit or vegetable. The blade has a narrow elongated front cutting portion, a narrow elongated spaced apart rear portion and short connecting end portions for attaching the blade to the handle. In a first aspect of the invention, the steady rest is an integral portion of the handle and has a fixed spatial relationship to the blade. In a second aspect, the steady rest is attached to the handle and its position on the handle is selectively adjustable to accommodate large differences in the size and shape of fruits or vegetables. In a third aspect, a pair of blades and steady rests are provided on a common handle.

14 Claims, 9 Drawing Sheets

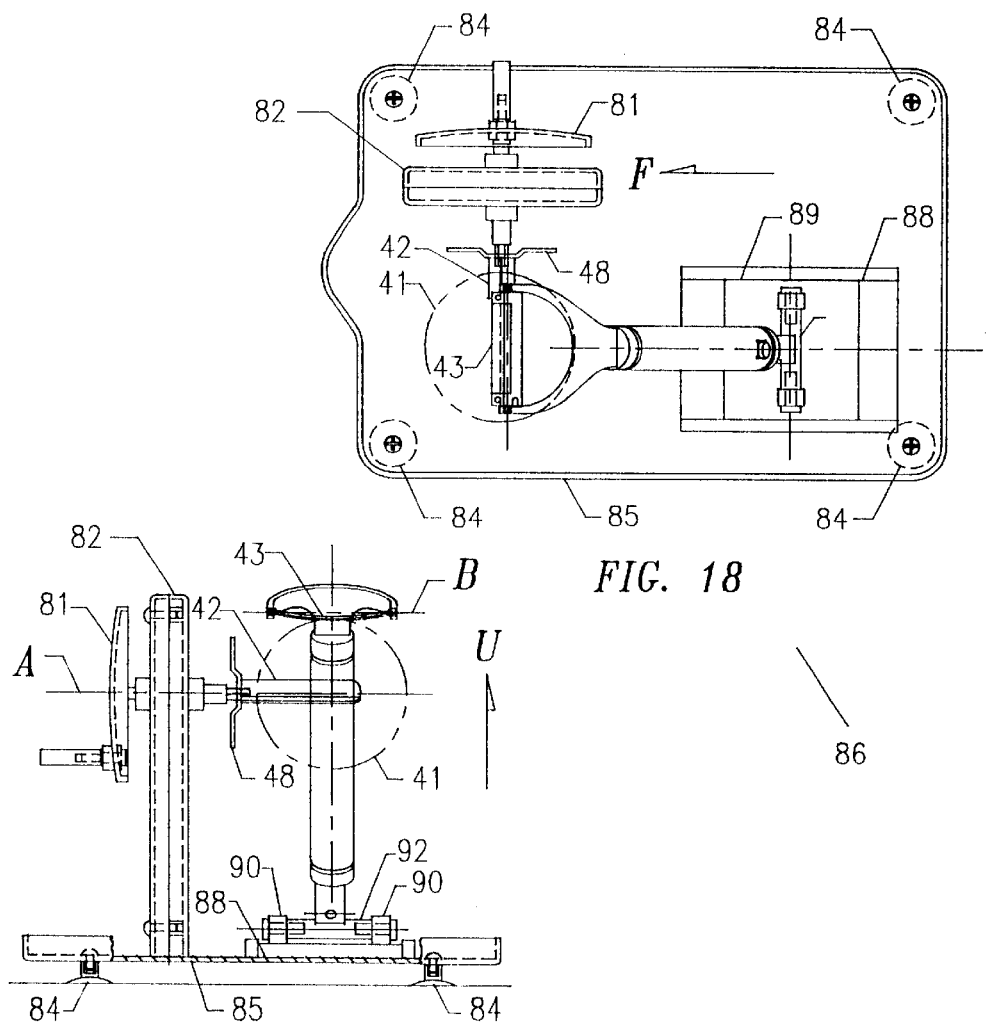
FIG. 18
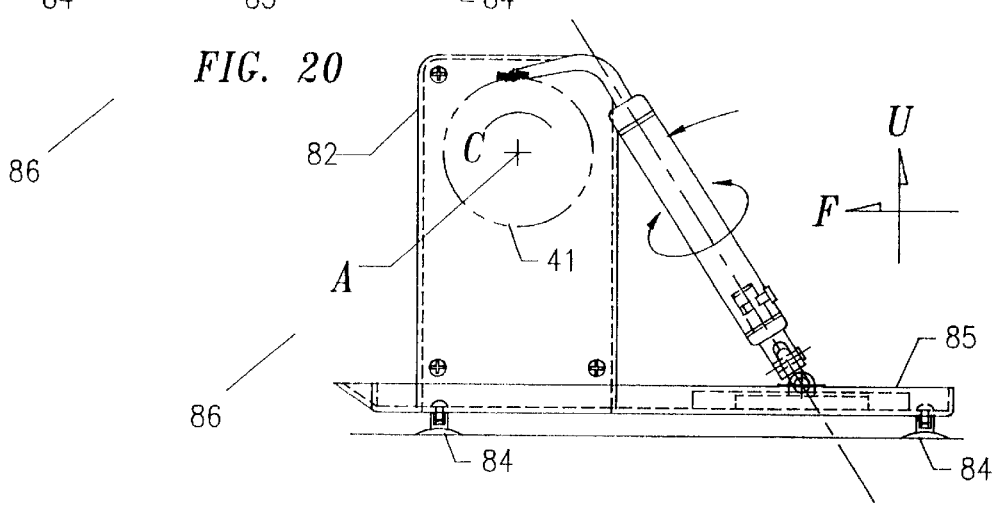
FIG. 20
FIG. 19

FRUIT AND VEGETABLE PEELER

This application is a divisional of U.S. application Ser. No. 09/028,103, filed Feb. 23, 1998 and now U.S. Pat. No. 6,082,253.

FIELD OF THE INVENTION

This invention relates to food processing and more particularly to a fruit and vegetable peeler.

BACKGROUND OF THE INVENTION

For many chefs and homemakers, peeling vegetables and fruits is a boring, unrewarding task and a frequent cause of cuts and callouses. Heretofore, maintaining contact of a hand controlled peeling blade with a fruit or vegetable has been exceedingly difficult. Moreover, it has not been possible to maintain orderly work areas with existing hand controlled peeling blades and methods. When large amounts of fruit or vegetables have been processed during cooking, baking, and canning, a great deal of time has been devoted to peeling and cleaning of work areas. A need exists for an economical, safe, efficient, and easy-to-use peeling apparatus for homemakers and small businesses.

SUMMARY OF THE INVENTION

The present invention satisfies the need for an economical, safe, efficient and easy-to-use peeling apparatus. One important benefit of the invention is that it provides a means for maintaining contact of a hand controlled peeling blade with a fruit or vegetable. This makes it possible for utilizing the smooth continuous motions of cranks and devices such as small kitchen appliances and power tools while still permitting intermittent peeling of portions of fruits and vegetables. The only peeling devices which applicant is aware of which employ hand controlled peeling blades are capable of either continuous or intermittent peeling, but not both. One benefit of continuous peeling is that it makes it possible to maintain a clean work area by producing continuous or near continuous peeling strips. Another benefit of the invention is that it reduces labor costs of establishments, such as restaurants, schools and hospitals.

The invention resides in features which individually and collectively contribute to its ability to employ devices such as manually rotatable arbors, hand cranks, small appliances and small power tools to continuously or non-continuously peel fruit and vegetables in a safe and efficient manner. A desirable feature of the invention is that it is readily adaptable to small electrical appliances and power tools, such as can openers, mixers, drills and screwdrivers. This feature further reduces peeling times.

The invention generally comprises a means for constraining a fruit or vegetable with respect to a peeling blade; a means for rotating the fruit or vegetable with respect to the peeling blade; and a means for controlling the motion of the peeling blade during peeling.

In a first aspect of the invention, a fruit or vegetable is mounted on an arbor which cooperates with a pair of surfaces to rotate and constrain the fruit or vegetable with respect to a peeling blade. One constraining surface is a portion of a handle on which the peeling blade is pivotally mounted. The other constraining surface is a surface of an article such as a counter top, table, chopping block or custom block. The arbor is attached to another handle which serves as the means for rotating the fruit or vegetable during peeling. The handle which carries the peeling blade also serves as the means for controlling the motion of the blade during peeling.

In a second aspect of the invention, the arbor is attached to a small power tool or appliance which in combination with the arbor serves as the means to rotate and constrain the fruit or vegetable with respect to the peeling blade. In a third aspect of the invention, the handle which carries the peeling blade is attached to a base which cooperates with the handle to control the motion of the blade.

Further objects, benefits and features of the invention will become apparent from the ensuing detailed description and drawings which illustrate and describe the invention. The best mode which is contemplated in practicing the invention together with the manner of using the invention are disclosed and the property in which exclusive rights are claimed is set forth in each of a series of numbered claims at the conclusion of the detailed description.

BRIEF DESCRIPTION OF THE DRAWINGS

The invention will be better understood and further objects, characterizing features, details and advantages thereof will appear more clearly with reference to the diagrammatic drawings illustrating a presently preferred specific embodiment of the invention by way of non-limiting example only. As used herein, words such as plan view, right side view, etc. refer to the directions of the arrows "F" and "U", respectively, in the drawings.

FIG. 18 is a plan view of an alternate embodiment showing the cranking device of FIGS. 14–17 and the peeling blade mounted on a common base.

FIG. 19 is left side view of the FIG. 18 embodiment.

FIG. 20 is a front view of the FIG. 18 embodiment.

DESCRIPTION OF THE PREFERRED EMBODIMENT

Figure 1:
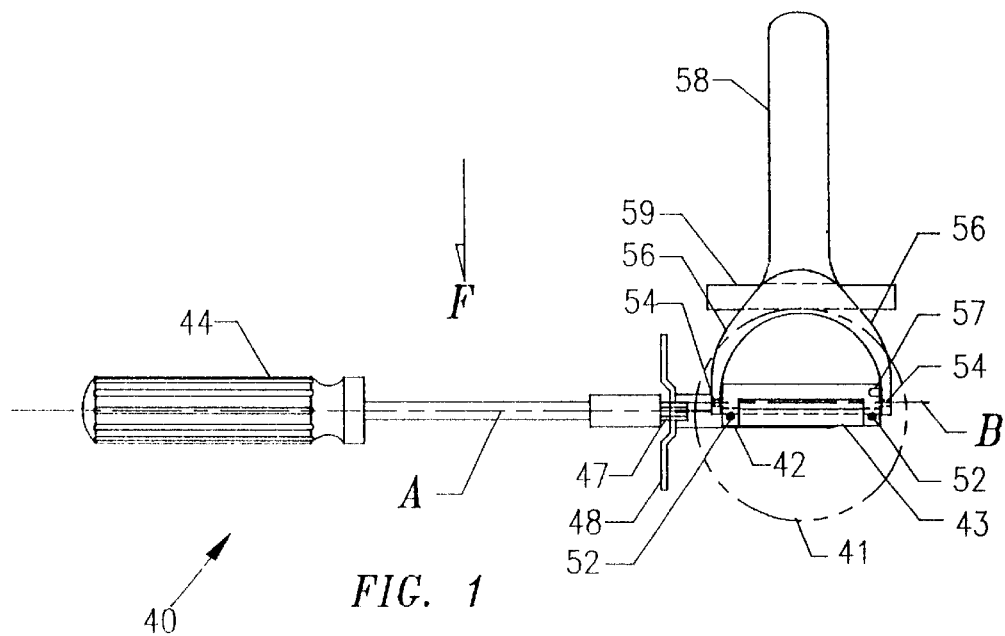
FIG. 1 is a plan view of a peeling apparatus and an apple, according to my invention.

Referring now to the drawings wherein like numerals designate similar and corresponding parts throughout the several views, in FIGS. 1 through 8, inclusive, a peeling apparatus 40 is illustrated, according to my invention. An apple 41, shown in phantom, is mounted on an arbor 42 which rotates about an axis "A", it being understood that my invention is applicable to most fruits and vegetables, including but not limited to, pears, onions, potatoes and turnips. For purposes of description, as used herein, directions such as "forward", "upward" and the like are indicated by the arrows "F" and "U", respectively, in the drawings.

The peeling apparatus 40 generally comprises a means for maintaining the location of a fruit or vegetable with respect to a peeling blade 43; a means for rotating the fruit or vegetable with respect to the peeling blade 43; and a means for controlling the motion of the peeling blade 43 during peeling. A distinguishing feature of my invention is that a continuous peeling strip 45 is produced rather than small peeling segments.

Figure 2:
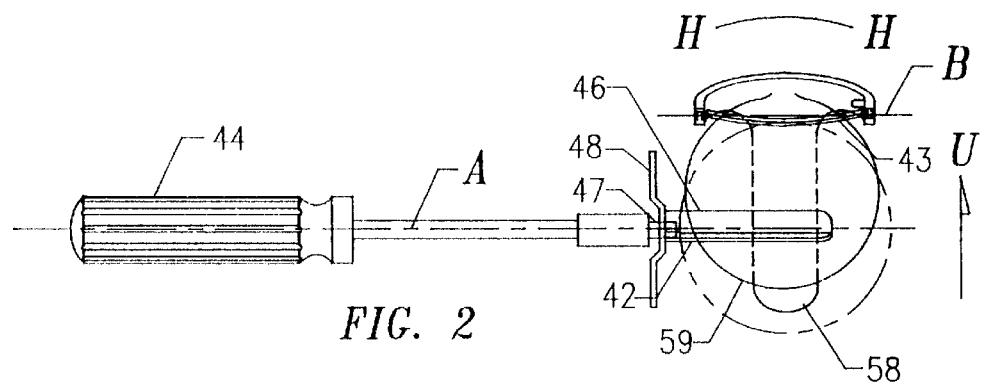
FIG. 2 is a front view of the FIG. 1 embodiment.
Figure 3:
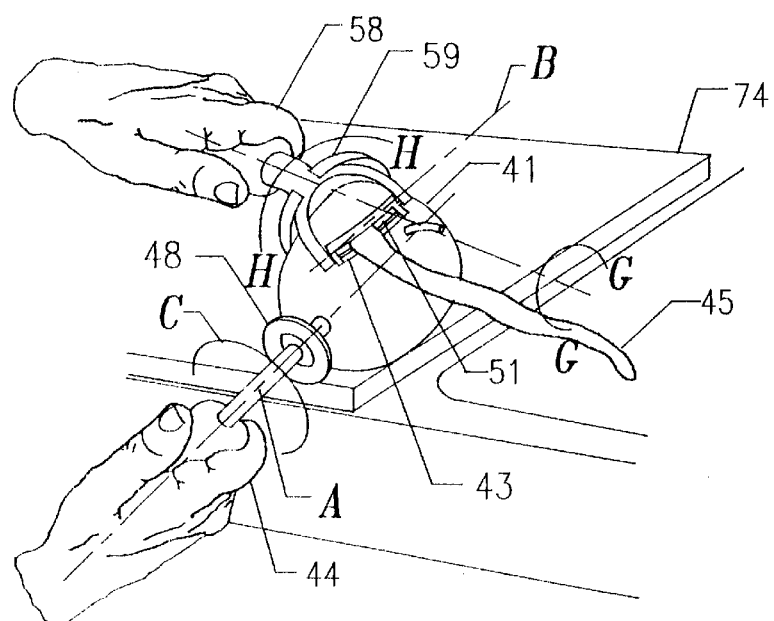
FIG. 3 is a perspective view showing the peeling apparatus and the apple during peeling.

With reference to FIGS. 1–3, the arbor 42 cooperates with a pair of surfaces to maintain the location of the apple with respect to the peeling blade 43. As shown in FIG. 3, one surface is a surface of a counter top 74 while the other surface is the surface of a steady rest portion 59 of a handle 58. It will be appreciated that surfaces of articles such as a table, chopping block or a custom block can be used in place of the counter top 74.

Figure 8:
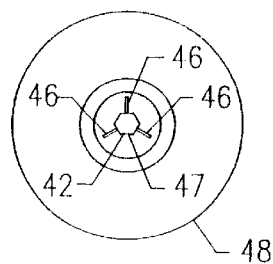
FIG. 8 is an enlarged right side view of the arbor of FIG. 7.
Figure 7:
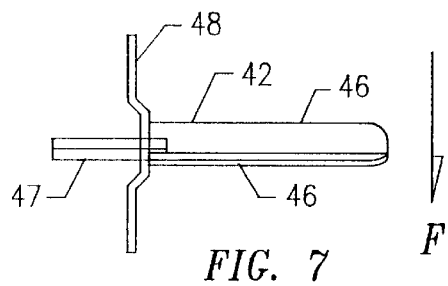
FIG. 7 is an enlarged front view of the arbor of the FIG. 1 embodiment.

The arbor 42 is preferably detachable and is mounted in an end portion of a handle 44. The handle 44 further serves as the means for rotating the apple 41. As best seen in FIGS. 7 and 8, the arbor 42 consists of three thin radial fins 46 which are equally spaced about an axis of the arbor 42. The corners of the arbor 42 are rounded to facilitate the mounting of the apple 41. The ends of the fins 46 opposite the rounded corners are attached to a short hex shaped shaft 47. The axis of the arbor 42 is coincident with an axis "A" about which the apple 41 rotates. During the rotation of the apple 41 in the direction of arrow "C" in FIG. 3, the apple 41 engages a sharp cutting edge 51 of the blade 43 to produce the continuous peeling strip 45.

The detachable arbor 42 is desirable for several reasons. It allows the use of optional arbors to accommodate differences in size, shape, hardness and texture of fruits and vegetables. It also simplifies the mounting and removal of the apple 41 and a cleaning of the arbor 42. The odd number of fins 46 prevents planar stresses from developing which could split the apple 41 in half as the apple 41 is pressed on to the arbor 42.

The short hex shaft 47 at the end of the arbor 42 engages a corresponding shaped aperture at the end of a handle 44. An existing screw driver handle which is used with interchangeable bits may be used, or a special handle having a hex aperture for attaching the arbor 42. Adjacent to the inner ends of the fins 46 is a circular collar 48 which is used for grasping the arbor 42 during the mounting or removal of the apple 41.

The construction of the peeling blade 43 which is an important element of my peeling apparatus 40 is best understood by reference to FIGS. 4, 5, 9 and 10. The peeling blade 43 is a generally rectangular blade comprised of an arcuate front strip 49 joined to an arcuate rear strip 50. The rear edge of the front strip 49 is spaced apart from the front edge of the rear strip 50 and is ground to a sharp knife edge 51. The arcuate shape is desirable for generating the continuous peeling strip because of variations in the contours of fruits and vegetables. The arcuate shape allows the cutting edge 51 to generate a peeling strip as it follows the contour of the apple 41. However, for fruits and vegetables in which abrupt changes in curvature do not occur, straight blades can be used with my invention.

At the ends of the rear strip 50 are tabs 52 which extend forwardly to attach the rear strip 50 with small screws 53 to the ends of the front strip 49. Other tabs 54 extend outwardly from the ends of the rear strip 50 to engage apertures 55 in spaced apart arm portions 56 of the handle 58 to pivotally mount the blade 43. The centers of the apertures 55 lie on an axis "B" about which the blade 43 may rotate a small amount to engage the cutting edge 51 with the apple 41. The maximum amount of rotation of the blade 43 rotation about the axis "B" is governed by a small protuberance 57 which projects inwardly from one of the arms 56 to contact the rear strip 50. Limiting the amount of blade rotation is desirable for initially engaging the blade 43 with the apple 41. The precise rotation of the blade 43 during peeling is determined by the contact of rear strip 50 with the apple 41.

The handle 58 which carries the blade 43 also serves as a means for controlling the motion of the blade 43 with respect to the apple 41 during peeling. The two-piece blade 43 is preferable over a single piece blade because it allows the front strip 49 to be made of a simple strip 49 of quality steel which is capable of maintaining a sharp cutting edge 51 and the rear strip 50 to be stamped of an easily formable low carbon steel. However, a single stamping can be used having a narrow slot for separating and offsetting the front and rear portions of the blade 43.

Figure 9:
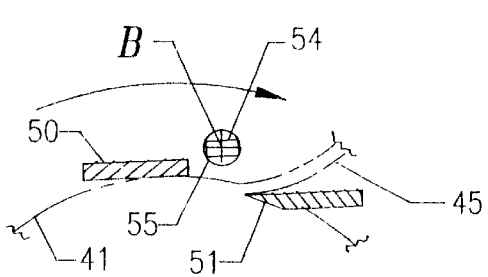
FIG. 9 is an enlarged cross-sectional view taken on the line 9—9 in FIG. 5.
Figure 4:
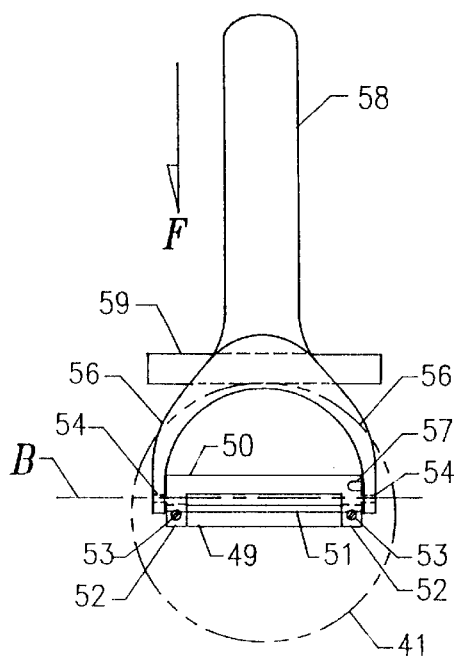
FIG. 4 is an enlarged plan view of the peeling blade and the handle of FIGS. 1–3.
Figure 10:
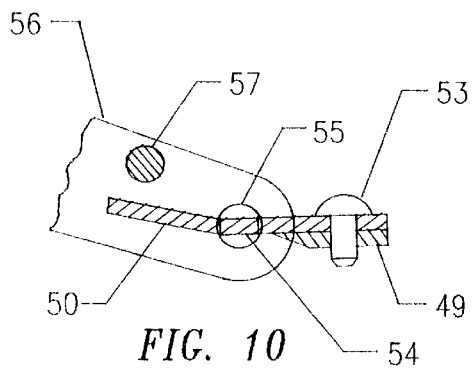
FIG. 10 is an enlarged cross-sectional view taken on the line 10—10 in FIG. 5.
Figure 5:
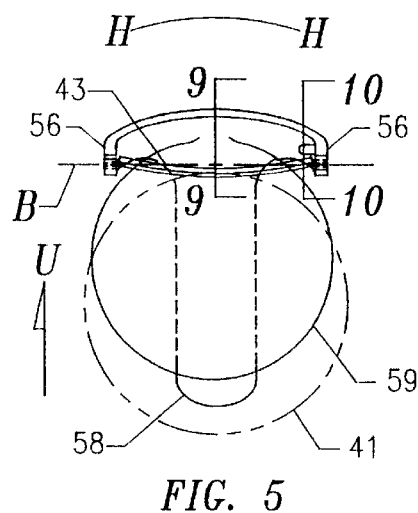
FIG. 5 is a front view of the peeling blade and the handle of FIG. 4.
Figure 6:
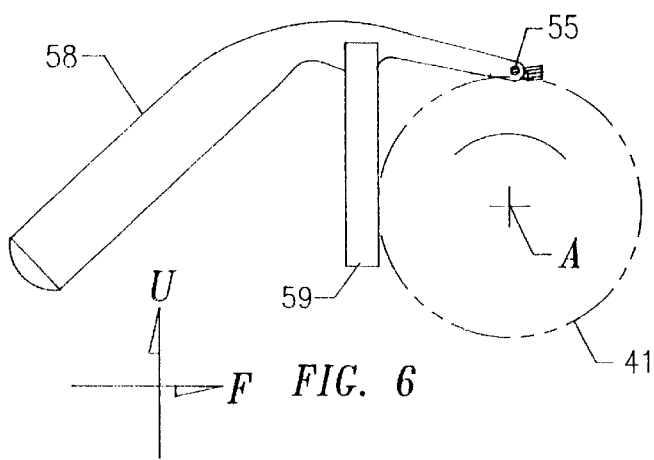
FIG. 6 is a right side view of the peeling blade and the handle of FIG. 4.

Referring to FIGS. 9 and 10, the relationship of the front strip 49 to the rear strip 50 is important to properly engage the cutting edge 51 with the apple 41. As shown in FIG. 9, the cutting edge 51 is offset below the pivot axis "B" and is offset below the rear strip 50 by small amounts. The cutting edge 51 is further offset forwardly of the pivot axis "B" and offset forwardly of rear strip 50. During peeling, the engagement of the cutting edge 51 produces a torque which causes the rear strip 50 to rest on the apple 41. The contact of the rear strip 50 with the apple 41 sets the depth of cut of the blade 43 and thickness of the peeling strip 45.

Figure 27:
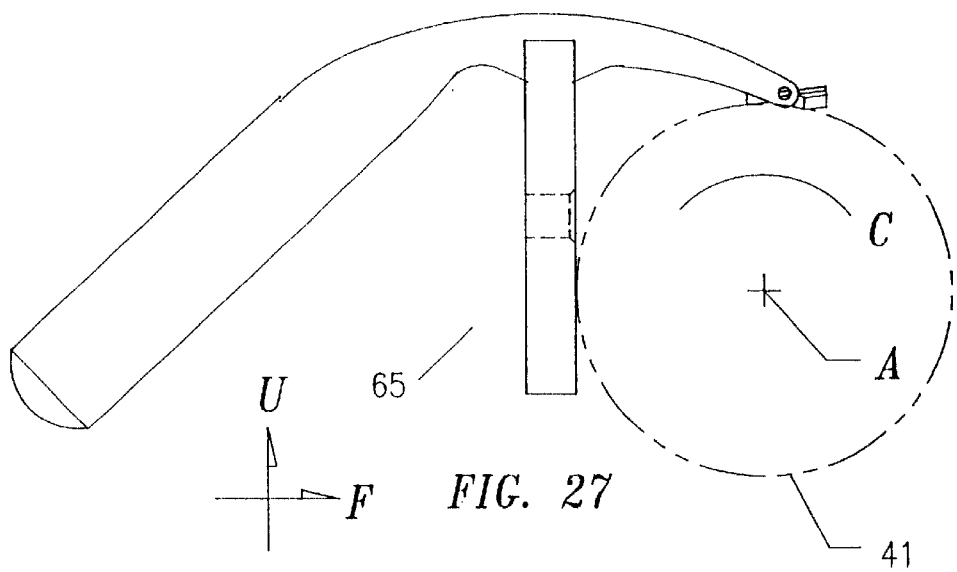
FIGS. 27 through 29 are front views of alternate embodiments for selectively varying the relationship between the apple and the peeling blade.
Figure 28:
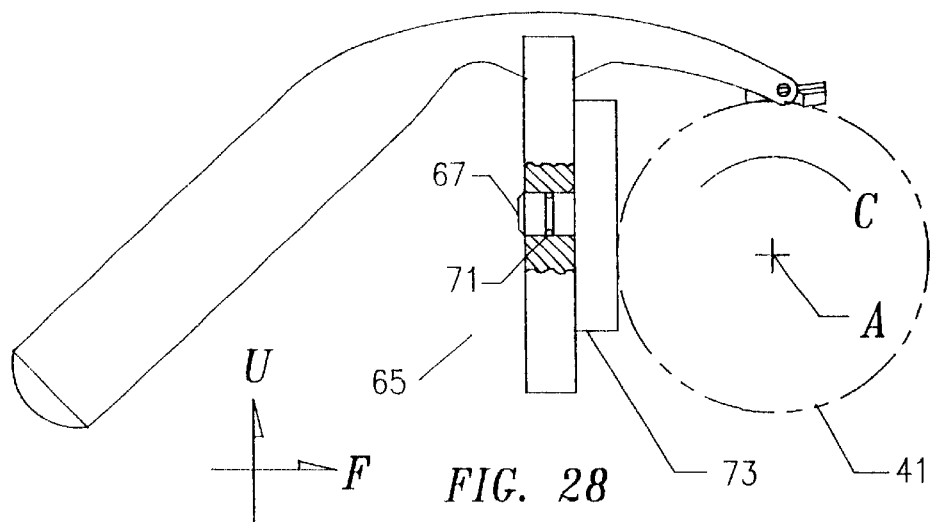
Figure 29:
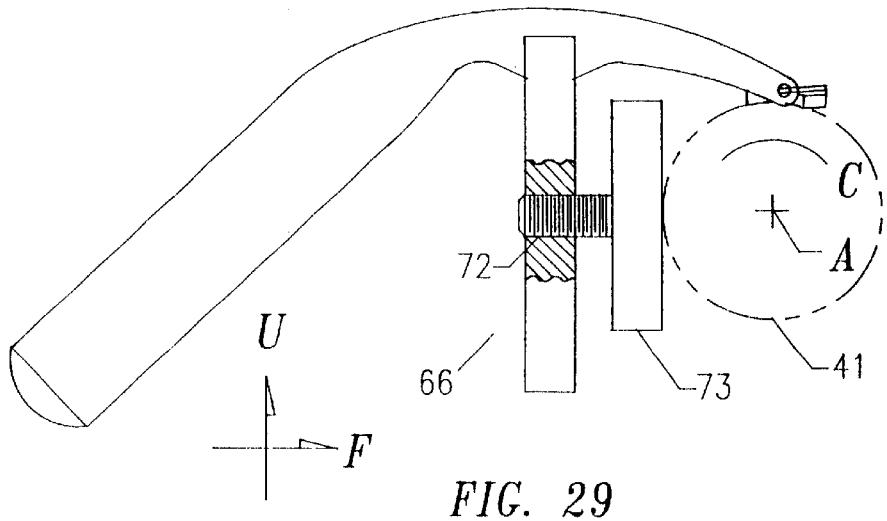
Figure 30:
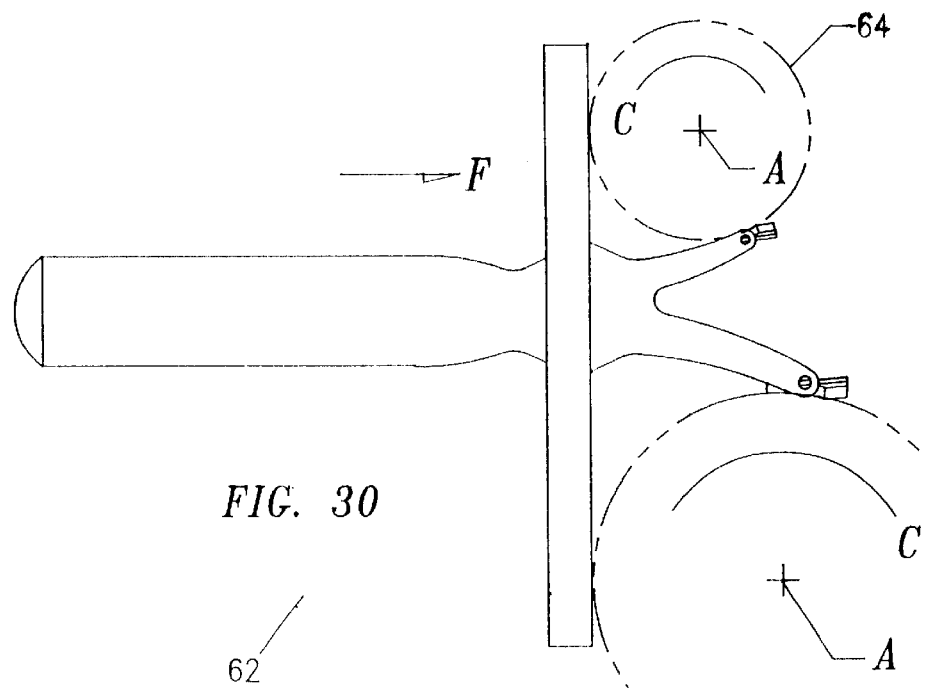
FIG. 30 is an alternate embodiment showing a pair of peeling blades mounted on a handle.
Figure 31:
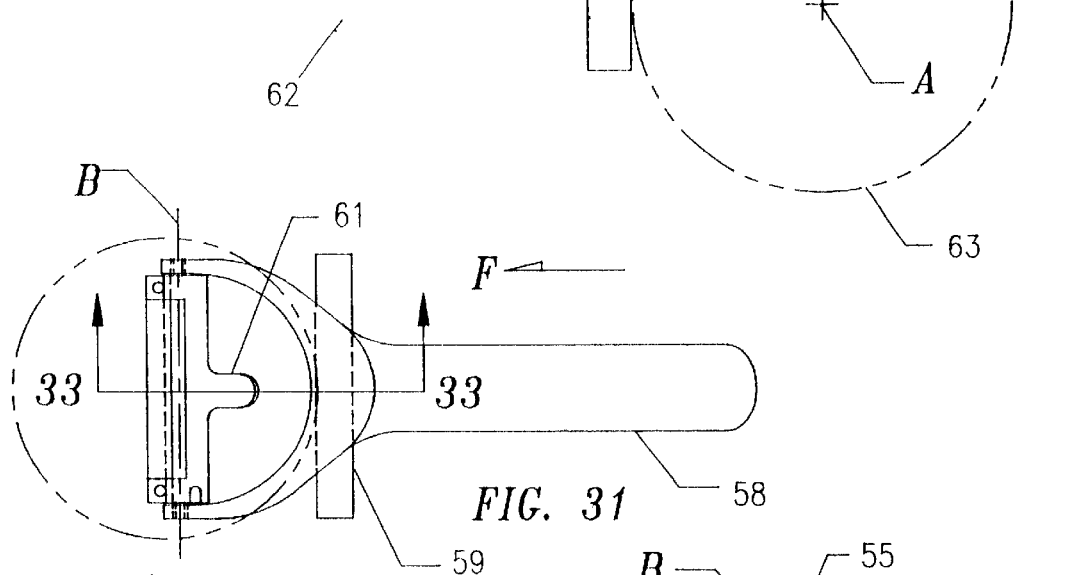
FIG. 31 is a plan view of an alternate embodiment of the peeling blade.
Figure 33:
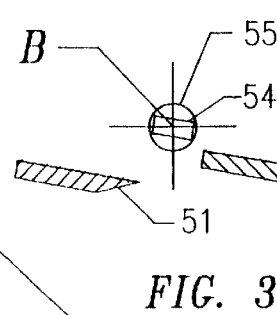
FIG. 33 is a cross-sectional view taken on the line 33—33 in FIG. 31.
Figure 32:
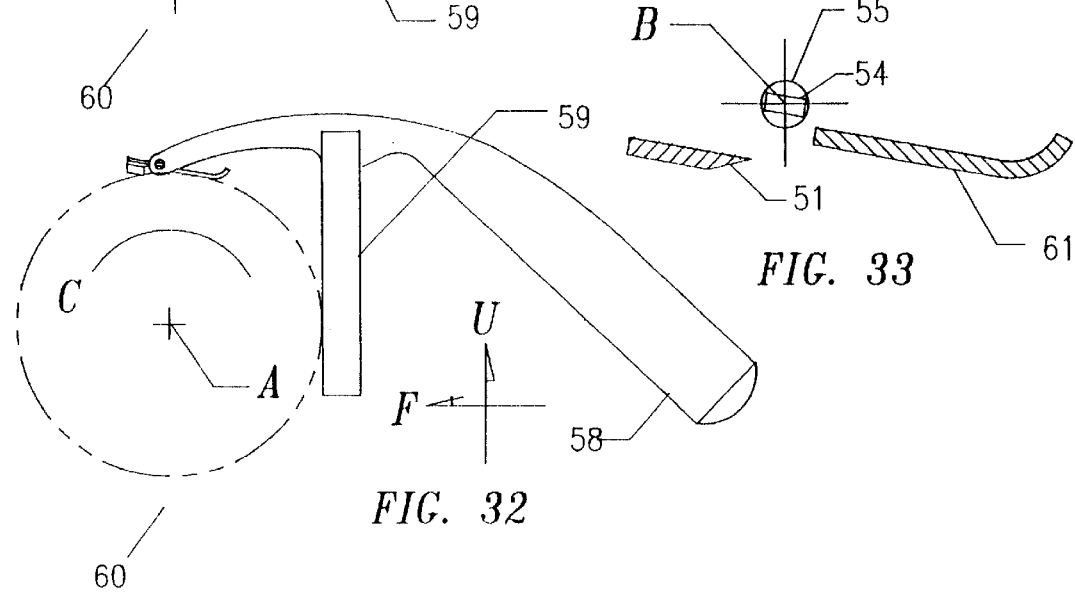
FIG. 32 is a left side view of the FIG. 30 embodiment.

In an alternate embodiment 60 illustrated in FIGS. 31–33, a narrow tab 61 extends rearwardly on the rear strip 50 to further control the rotation of the blade 43 and depth of cut of the cutting edge 51. In an alternate embodiment illustrated in FIG. 30, a pair of blades 43 are mounted on a common handle for peeling large 63 and small 64 apples. In FIGS. 27, 28 and 29, embodiments 65, 66 are disclosed for selectively adjusting the position of the apple 41 with respect to the cutting edge 51.

In an embodiment 65 shown in FIGS. 27 and 28, the location of the surface of the steady rest which constrains the apple 41 with respect to the cutting edge can be adjusted. A small cylindrical post 67 in the center of an auxiliary steady rest 68 engages an aperture 69 of a steady rest 70. A small rubber "O" ring 71 on the center post 67 provides a snug fit of the center post 67 in the aperture 69. In the embodiment 66 of FIG. 29, a small cylindrical post 72 engages a threaded aperture 73 of a steady rest.

The peeling apparatus 40 of FIGS. 1 through 8 is used in the following manner. The apple 41 is mounted on the arbor 42 as shown in FIGS. 1 and 2 by piercing the center of the apple 41 with the arbor's fins 46. The arbor 42 is next attached to the handle 44 by engaging the arbor's hex end portion 47 with the handle 44. After the arbor 42 is attached, the handle 44 is grasped with one of the user's hands and the other handle 58 which carries the blade 43 is grasped with the other of the user's hands and the apple is placed on the counter top 74. The apple 41 is next oriented and engaged with the cutting edge 51 of the blade 43 as shown in FIG. 3. After the cutting edge 51 is engaged, the arbor 42 is continuously or non-continuously rotated with the user's hand about the axis "A" in the direction of arrow "C", and the blade 43 is traversed from side to side across the apple 41 in the direction of arrows H—H to produce either a continuous peeling strip 45 or segments (not shown). During the traversal of the blade 43 across the apple 41, the blade 43 may also be rotated with the handle 58 in the direction of the arrows G—G as shown in FIG. 3 to engage the outer portions of the cutting edge 51 with the apple 41. After peeling has been completed, the apple 41 and arbor 42 are removed from the handle 44, the collar 58 is grasped with a user's hand and the apple 41 is removed from the collar 58.

Figure 11:
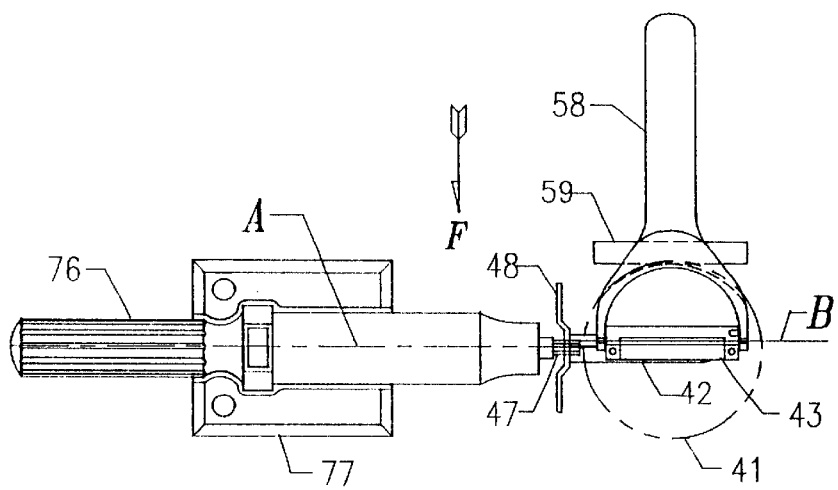
FIG. 11 is a plan view of an alternate embodiment wherein the arbor and the apple are supported on a manual cranking device.
Figure 12:
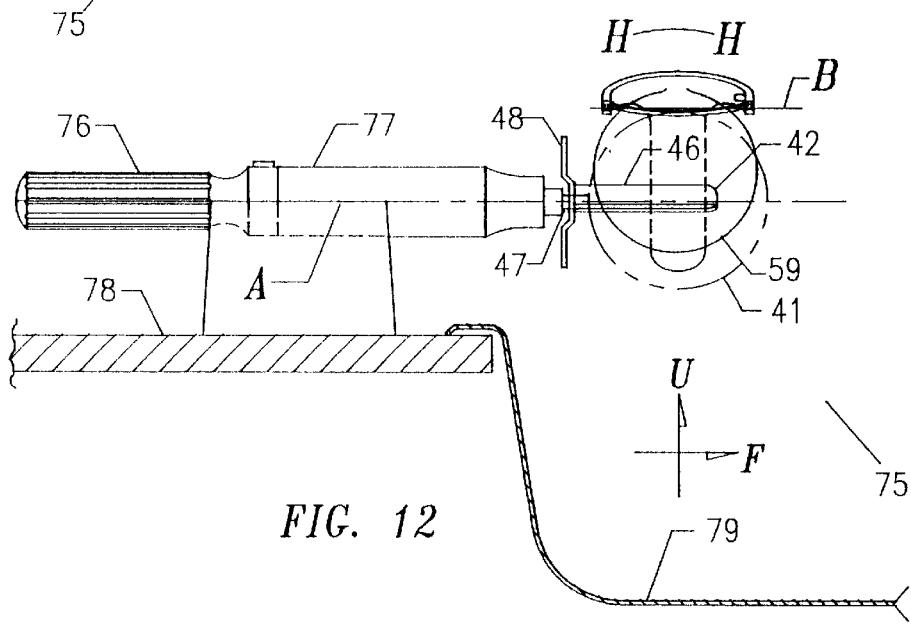
FIG. 12 is a front view of the FIG. 11 embodiment.
Figure 13:
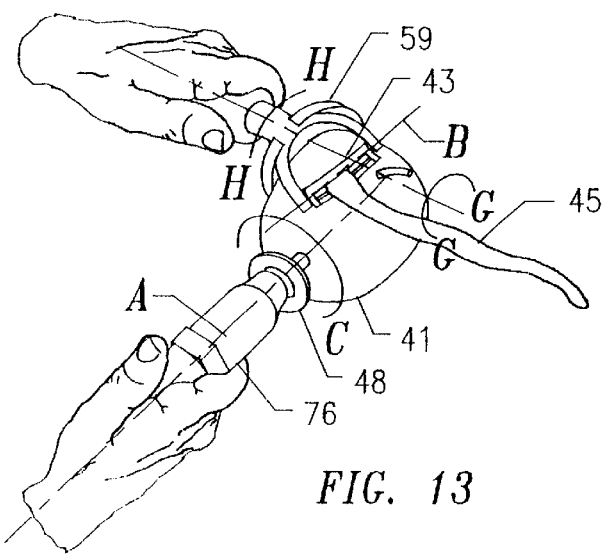
FIG. 13 is a perspective view of the apple mounted on the power screwdriver during peeling.
Figure 16:
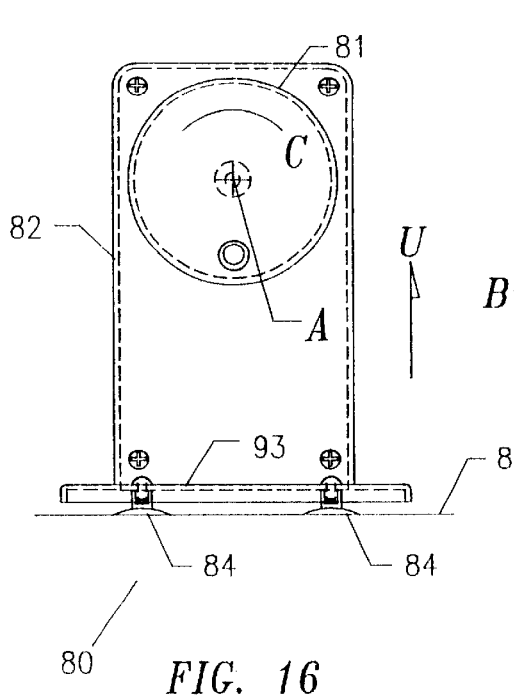
FIG. 16 is a right side view of the FIG. 14 embodiment.
Figure 14:
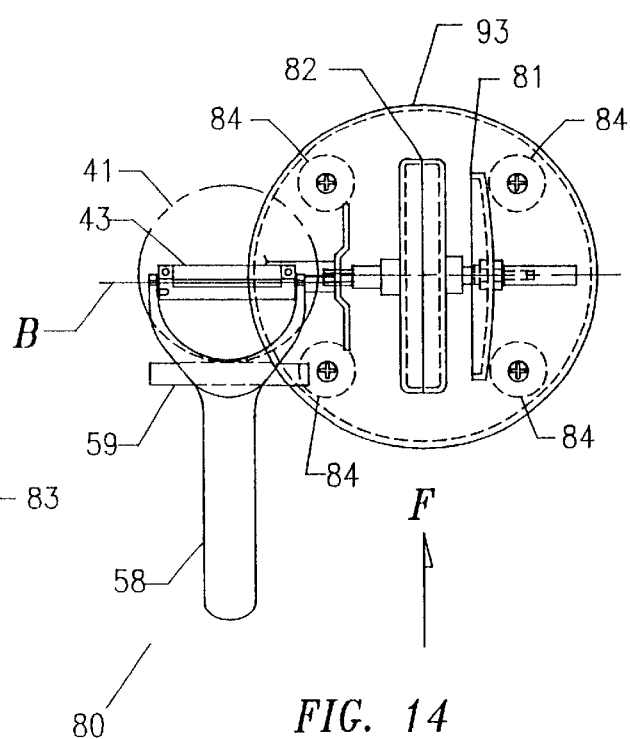
FIG. 14 is a plan view of an alternate embodiment showing the arbor and the apple supported on a manual cranking device.
Figure 17:
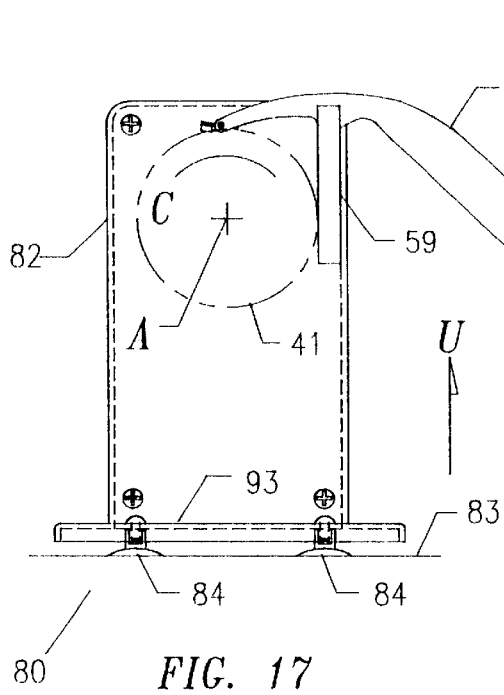
FIG. 17 is a left side view of the FIG. 14 embodiment.
Figure 15:
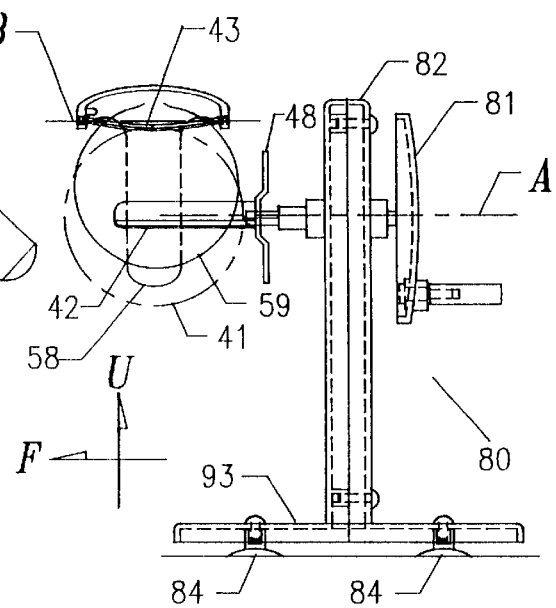
FIG. 15 is a rear view of the FIG. 14 embodiment.
Figures 21, 23:
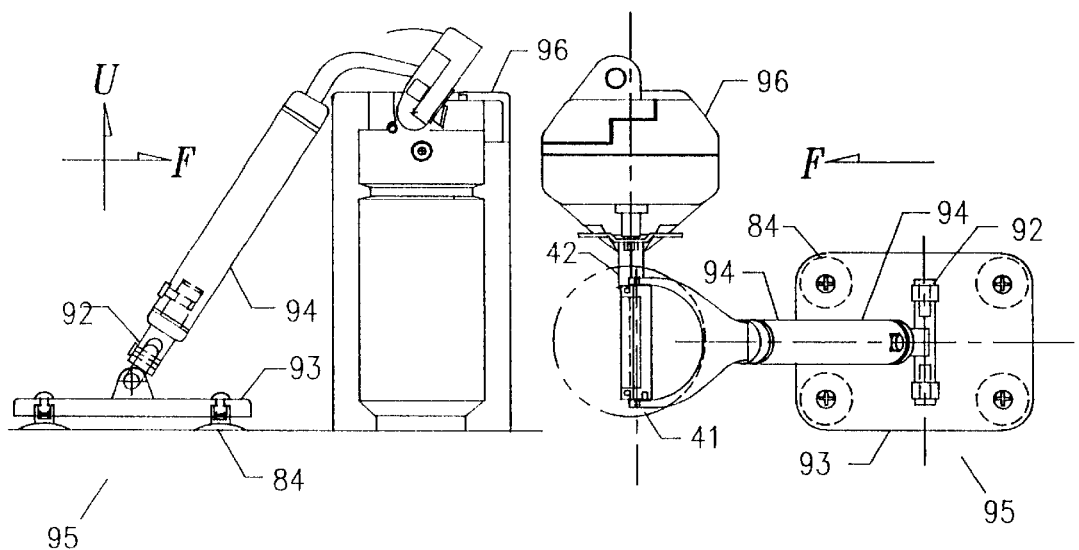
FIG. 21 is a plan view of an alternate embodiment wherein the apple and the arbor are mounted on an electric can opener.
FIG. 23 is a right side view of the FIG. 21 embodiment.
Figures 22, 24:
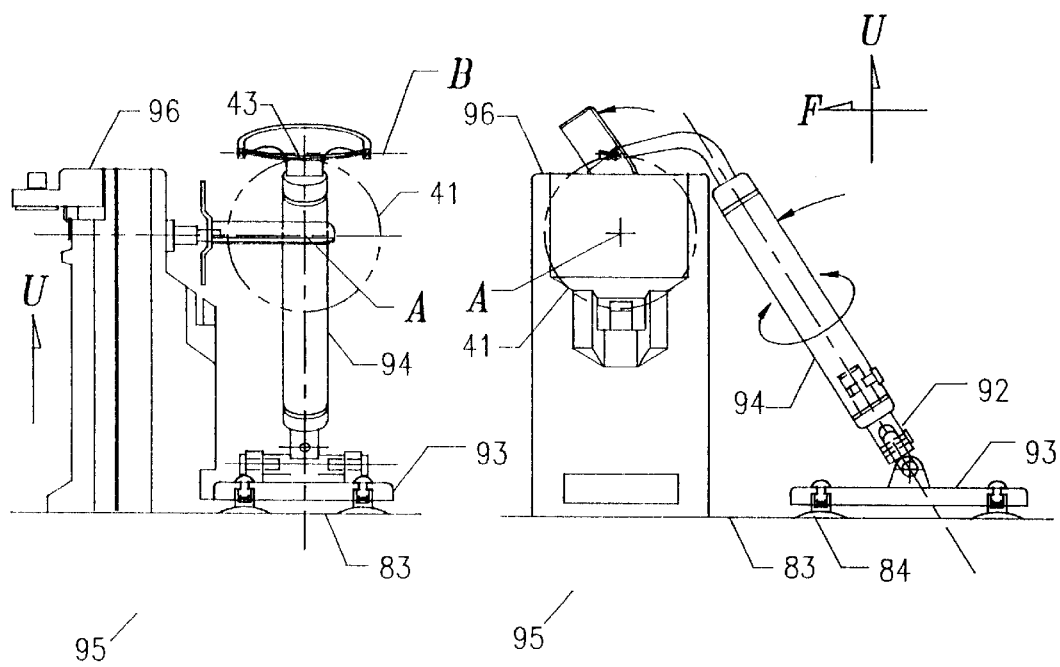
FIG. 22 is a left side view of the FIG. 21 embodiment.
FIG. 24 is a front view of the FIG. 21 embodiment.

In place of a manual means, such as the handle 44 of FIGS. 1–8, a small battery operated or conventional ac motor may be used to rotate the apple 41, it being necessary to control the motor's speed by the usual gear or electronic means. In the alternate embodiment 75 of FIGS. 11–13, the arbor 42 is detachably mounted in an existing power screwdriver 76. The screwdriver 76 is exemplary of a battery operated means for rotating the apple 41 and cooperates with the arbor 42 to locate the apple 41 with respect to the blade 43. The screwdriver 76 is mounted on a charging stand 77 which is supplied with the screwdriver 76. The stand 77 rests on a counter top 78 such that the apple 41 overhangs an edge of a sink 79 to deposit the peeling 45 into the sink 79. In FIG. 13, the charging stand 77 has been deleted to illustrate that the charging stand 77 is not an indispensable element of my invention.

Referring to FIGS. 14 through 17, an embodiment 80 is shown wherein the arbor 42 is detachably mounted in a manual crank 81 which serves as the rotating means. The crank 81 cooperates with the arbor 42 to provide the means for positioning the apple 41 with respect to the blade 43. The crank 81 is mounted in a housing 82 which rests on a surface 83 of a table or a counter top. The housing 82 is secured to the surface 83 with suction cups 84 at each of the corners of a base 93.

In the embodiment 86 of FIGS. 18 through 20, the manual crank 81 and peeling blade 43 are supported on a common base 87. A lower end portion of a handle 94 is rotatably connected to an intermediate member 92 which is pivotally connected to a slider plate 89. The slider plate 89 is free to move in opposite directions in a track 88 of the base 87. The handle 94, intermediate member 92, slider plate 89 and base 87 cooperate to provide the means for controlling the motion of the blade 43 during the continuous peeling. During peeling, the motion of the handle 94 is controlled with one of the user's hands.

Figure 25:
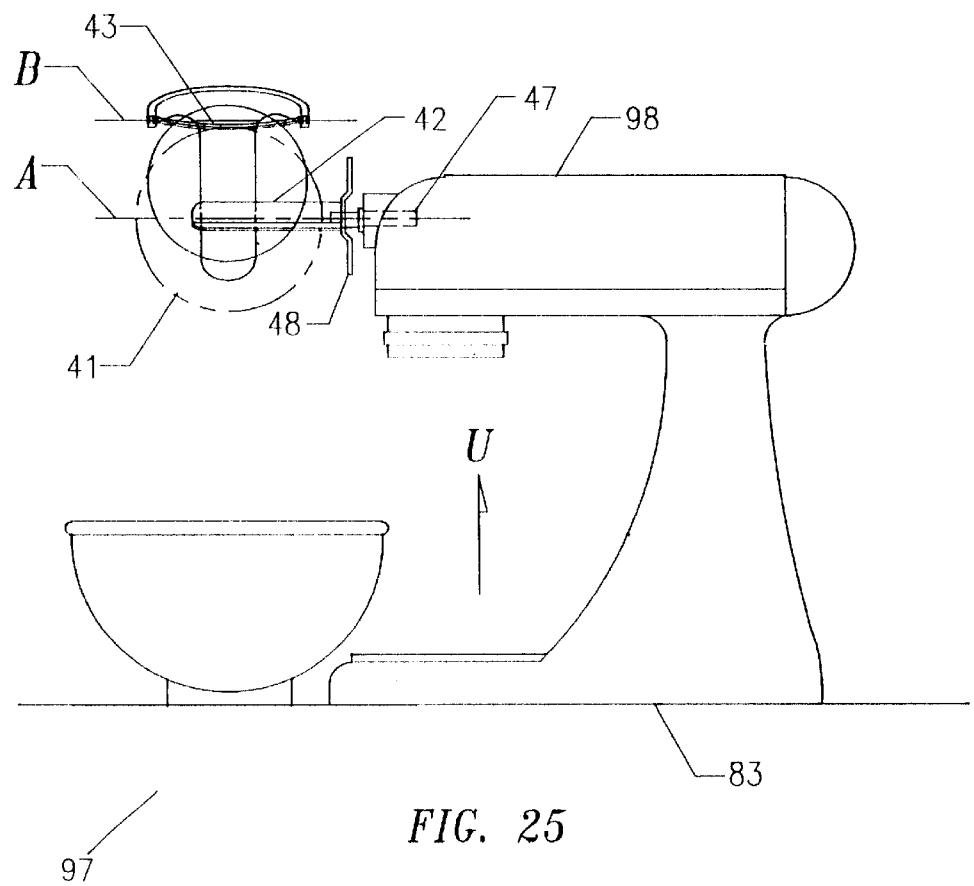
FIG. 25 is a front view of an alternate embodiment wherein the arbor and the apple are mounted on an electric mixer.
Figure 26:
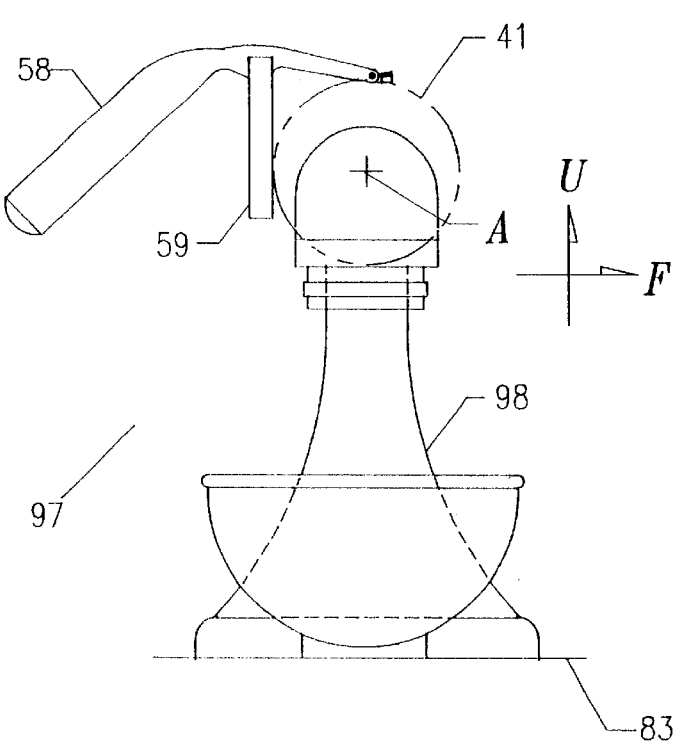
FIG. 26 is a right side view of the FIG. 25 embodiment.

In FIGS. 21 through 24 an embodiment 95 is shown which is exemplary of the use of an AC motor for rotating the apple 41. In this embodiment 95, the arbor 42 is detachably mounted in a conventional electric can opener 96 and cooperates with the can opener 96 to locate and rotate the apple 41 with respect to the blade 43. In FIGS. 25 and 26, an embodiment 97 is shown wherein a conventional electric mixer 98 is used in place of the can opener 96. Peelings from the apple 41 are deposited in a bowl.

From the foregoing it will be apparent that my invention provides numerous advantages over existing peeling devices. Moreover, my improved, efficient, easy-to-use peeler provides these advantages in homes, restaurants and other commercial establishments. A unique feature of my invention is that my invention can be used in a continuous or interrupted manner for peeling fruits and vegetables.

Although I have illustrated and described only several embodiments of my invention, it is not my intention to limit my invention to these embodiments, since other embodiments can be developed by obvious changes in material, shape as well as substitution, elimination and arrangement of parts without departing from the spirit thereof.

I claim:

1. A fruit and vegetable peeler apparatus for peeling fruits and vegetables comprising: a handle for grasping said peeler apparatus and pivotally mounting and controlling the motion of a peeling blade to peel an outer portion of a fruit or a vegetable; a peeling blade pivotally mounted in said handle for rotation about an axis, said peeling blade having a narrow sharp front cutting strip and a narrow spaced apart rear strip joined to said front strip at end portions of said front strip, said narrow front cutting strip being offset by a small amount below said axis of said blade, when said axis is in an operative horizontal position; and a steady rest mounted on said handle to position said fruit or said vegetable with respect to said peeling blade during said peeling of said fruit or said vegetable.

2. A fruit and vegetable peeler for peeling fruits and vegetables comprising: a handle for pivotally mounting and controlling the motion of a peeling blade to peel a continuous strip of an outer portion of a fruit or a vegetable; a peeling blade pivotally mounted in said handle for rotation about an axis, said peeling blade having a narrow front sharp cutting strip and a narrow spaced apart rear strip joined to said front strip at end portions of said front strip, said narrow front cutting strip being offset by small amounts below said axis of said blade when said axis is in a horizontal operative position; and a means for positioning said fruit or said vegetable with respect to said peeling blade during said peeling of said fruit or said vegetable.

3. The fruit and vegetable peeler set forth in claim 2 further comprising a second peeling blade pivotally mounted in said handle.

4. The fruit and vegetable peeler set forth in claim 1 wherein the spatial relationship of said steady rest on said handle and said peeling blade for positioning said fruit or said vegetable with respect to said peeling blade is selectively adjustable.

5. In combination with an arbor for mounting and manually rotating fruits or vegetables, a fruit and vegetable peeler for peeling said fruits and vegetables comprising: a handle for mounting and supporting a peeling blade; a pivotally mounted arcuate peeling blade mounted in said handle, said peeling blade having a narrow sharp front cutting strip and a narrow spaced apart rear strip joined to said front strip at end portions of said front strip, said narrow front cutting strip being offset by a small amount below said axis of said blade, when said axis is in a horizontal operative position; and a steady rest for locating a fruit or vegetable with respect to said peeling blade to produce a continuous peeling strip during said peeling.

6. The fruit and vegetable peeler set forth in claim 5 wherein said peeling blade has a narrow rearward extending center portion.

7. The fruit and vegetable peeler set forth in claim 5 wherein said peeling blade has narrow elongated front portion and a narrow elongated rear portion spaced apart a small amount from said front portion, said front portion having a sharp cutting edge extending along a rear edge portion of said front strip, said cutting edge being offset by a small amount below said rear strip and being offset by a small amount forward of said rear strip when said cutting edge is in a horizontal operative position and further comprising at least one pair of spaced apart end portions of said handle for pivotally mounting said peeling blade in said handle.

8. The apparatus set forth in claim 5, wherein said arbor is detachable from a means for manually rotating said arbor.

9. The apparatus set forth in claim 6 wherein said narrow elongated front portion and said narrow elongated rear portion of said peeling blade are arcuate portions.

10. The fruit and vegetable peeler set forth in claim 1 wherein said narrow spaced apart strips of said cutting blade are arcuate strips, each of said arcuate strips having center portions which are below end portions of said strips when said blade is horizontal.

11. The fruit and vegetable peeler set forth in claim 1 wherein said cutting strip is offset forwardly of said rear strip and further comprising a means on said handle for limiting a rotation of said blade to initially engage said blade with said fruit or vegetable.

12. The fruit and vegetable peeler set forth in claim 1 further comprising a second peeling blade pivotally mounted in said handle, said steady rest further positioning a fruit or said vegetable with respect to said second peeling blade during a peeling of said fruit or said vegetable.

13. The fruit and vegetable peeler set forth in claim 1 wherein said a center portion of said rear strip of said peeling blade has a rearward extending up turned tab to control a rotation and depth of cut of said peeling blade.

14. The fruit and vegetable peeler set forth in claim 1 wherein said narrow front strip of said peeling blade it attached to said narrow rear strip of said peeling blade with a pair of threaded fasteners.

* * * * *